United States Patent [19]

Kirby et al.

[11] Patent Number: 5,091,233
[45] Date of Patent: * Feb. 25, 1992

[54] GETTER STRUCTURE FOR VACUUM INSULATION PANELS

[75] Inventors: David B. Kirby; Nihat O. Cur, both of St. Joseph Township, Berrien County, Mich.

[73] Assignee: Whirlpool Corporation, Benton Harbor, Mich.

[*] Notice: The portion of the term of this patent subsequent to May 28, 2008 has been disclaimed.

[21] Appl. No.: 452,068

[22] Filed: Dec. 18, 1989

[51] Int. Cl.⁵ .................. B32B 3/28; B32B 1/06
[52] U.S. Cl. .................... 428/69; 428/36.7; 428/68; 428/76; 428/520; 220/421; 220/422; 206/524.8; 206/484; 206/484.2; 52/406
[58] Field of Search ............ 428/36.7, 68, 69, 76, 428/520, 67, 118, 172, 136; 220/421, 422, 420, 423, 444; 206/524.8, 484, 484.2; 52/406

[56] References Cited

U.S. PATENT DOCUMENTS

| | | | |
|---|---|---|---|
| 2,768,046 | 10/1956 | Evans | 312/214 |
| 2,779,066 | 1/1957 | Gaugler et al. | 52/406 |
| 2,817,124 | 12/1957 | Dybvig | 220/422 |
| 2,863,179 | 12/1958 | Gaugler et al. | 52/406 |
| 2,989,156 | 6/1961 | Brooks et al. | 52/791 |
| 3,108,706 | 10/1963 | Matsch | 220/423 |
| 3,139,206 | 6/1964 | Matsch | 220/423 |
| 3,151,364 | 10/1964 | Glaser | 220/442 |
| 3,179,549 | 4/1965 | Strong et al. | 428/69 |
| 3,199,715 | 8/1965 | Paivanas | 220/424 |
| 3,264,165 | 8/1966 | Stickel | 428/69 |
| 3,514,006 | 5/1970 | Molnar | 220/423 |
| 4,000,246 | 12/1976 | Walles | 423/230 |
| 4,048,361 | 9/1977 | Valyi | 428/36.7 |
| 4,444,821 | 4/1984 | Young et al. | 428/69 |
| 4,529,638 | 7/1985 | Yamamoto et al. | 428/69 |
| 4,536,409 | 8/1985 | Farrell | 428/36.7 |
| 4,662,521 | 5/1987 | Moretti | 206/484.2 |
| 4,668,551 | 5/1987 | Kawasaki et al. | 428/69 |
| 4,668,555 | 5/1987 | Uekado et al. | 428/69 |
| 4,669,632 | 6/1987 | Kawasaki et al. | 220/423 |
| 4,681,788 | 7/1987 | Barito et al. | 428/68 |
| 4,683,702 | 8/1987 | Vis | 53/433 |
| 4,702,963 | 10/1987 | Phillips et al. | 428/426 |
| 4,726,974 | 2/1988 | Nowobilski | 428/69 |

*Primary Examiner*—Ellis P. Robinson
*Assistant Examiner*—Rena L. Dye
*Attorney, Agent, or Firm*—Hill, Van Santen, Steadman & Simpson

[57] ABSTRACT

A getter structure is provided which can be handled for relatively short periods of time in open atmosphere and yet provides prolonged gettering action over relatively long periods of time when utilized in a sealed compartment. The getter structure has a thin flexible substrate upon which a getter material is applied. A barrier layer is applied to the getter material to prevent rapid reaction by the getter material with the atmosphere. The substrate or barrier layer is semi-permeable and is selected to provide the desired degree of permeation of the layer to the getter material to result in the action described. Such a getter structure is useful in a vacuum insulation panel, particularly in a getter system in a multiple compartment panel where different getter materials are utilized in different compartments so as to maximize the effectiveness of the use of the getter materials, while minimizing the cost of the getter materials required to provide the desired degree of gas gettering.

10 Claims, 2 Drawing Sheets

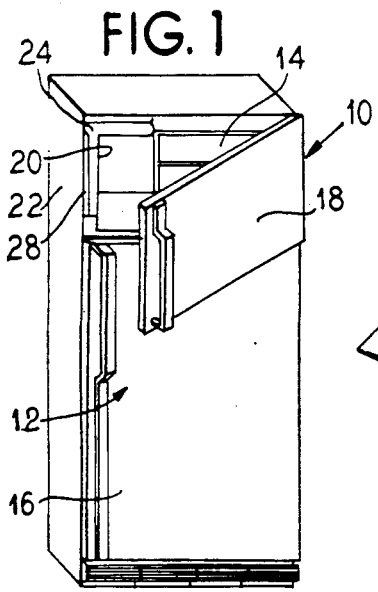
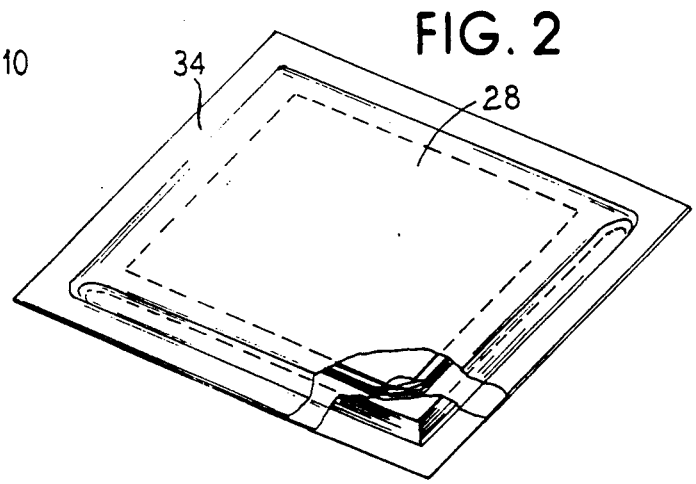
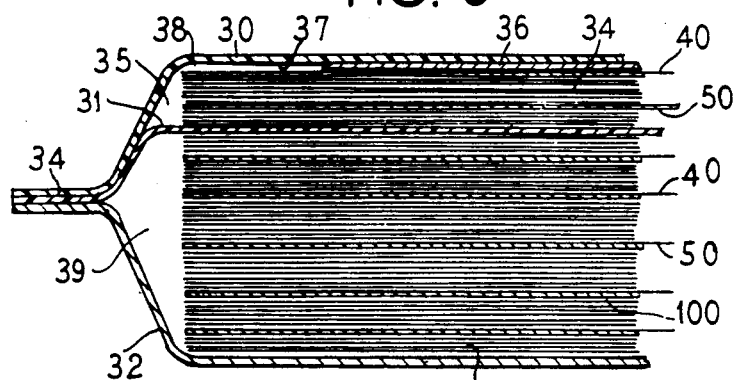
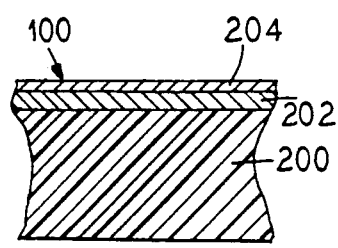
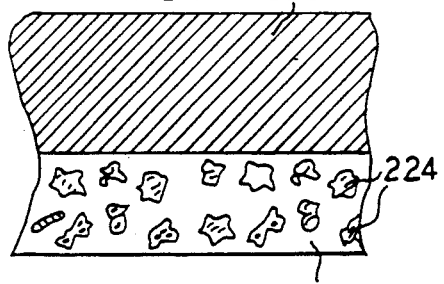
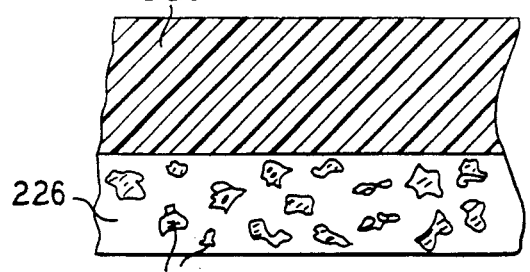
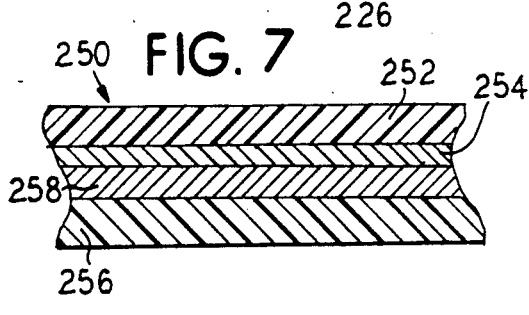
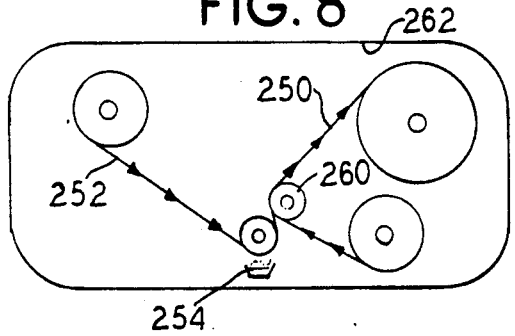

GETTER STRUCTURE FOR VACUUM INSULATION PANELS

BACKGROUND OF THE INVENTION

This invention relates to getter structures, and more particularly to getter structures that can be handled in ambient atmosphere during manufacture of enclosures receiving such getter structures.

Getter materials, that is materials which absorb gases and vapors, including water vapor, are well known and are used in a wide variety of enclosures to continuously absorb various gases and vapors, depending on the particular getter material employed, to either protect components located within the enclosure or to maintain a certain characteristic of the atmosphere within the enclosure, such as a dry atmosphere or a very low pressure atmosphere. One particular environment in which getter materials are used are vacuum insulation panels.

Vacuum insulation panels are known for various uses including use in refrigeration appliances where they greatly enhance the degree of thermal insulation within the cabinet of the appliance. Such panels must remain effective for the life of the appliance, generally a period in excess of 20 years. To do so, the panels must be highly gas impervious, yet must be able to prevent transmission of heat not solely by conduction and radiation through the panels, but also by conduction along the surface of the panels. Further, any gases and vapors that do permeate the panel walls in excess of what is tolerable, depending on the panel filler insulation material, must be absorbed or otherwise captured to prevent degradation of the panels which, for insulation purposes, are most effective only when the interiors of the respective panels are evacuated to a very low pressure by removal of all gases and vapors (the desired vacuum level depends on the specific filler insulation material).

U.S. Pat. No. 2,863,179 discloses a multi-compartment insulation material for refrigerators. An inner bag seals a fibrous material in an insulating gas filled environment, and is intended to prevent the insulating gas from escaping. An outer bag contains the inner bag and an adjacent layer of fibrous insulation. The purpose of the outer bag is to prevent moisture and air from entering the inner bag, and to minimize abrasions caused by handling, however, the inner bag is not shielded from atmospheric pressure.

It is important in the construction of vacuum thermal insulation panels to prevent the vacuum within the panels from being deteriorated and eventually lost due to slight permeability of the walls of the panel. Therefore, as is known in the art, "getter" materials are placed within the panel to absorb various gases including oxygen, water vapor, nitrogen, etc. Use of such getter materials in vacuum insulation panels is known and is disclosed in U.S. Pat. Nos. 4,000,246; 4,444,821; 4,668,551; 4,702,963 and 4,726,974. Each of said patents discloses the use of a getter material in a single compartment of a vacuum insulation panel. A problem resulting from the use of such getter materials is that some getter materials may absorb more than one type of gas and thus may be consumed by a relatively prevalent type of gas, such as water vapor, and thus would not be available to absorb other gases, while less expensive materials should be used for absorbing water vapor. Once the getter materials have been consumed, degradation of the panel will begin.

SUMMARY OF THE INVENTION

The present invention provides an improvement in getter structures which have a particular utility in connection with vacuum insulation panels. Getters are used in vacuum insulation panels to remove gaseous components which: remain due to imperfect evacuation; outgas or desorb from the filler and other interior components; permeate the enclosure from the outside atmosphere; and comprise reaction products of gases with the getter. The gases that might be expected in a vacuum insulation of the type useful in a refrigeration device would be $O_2$, $N_2$, $H_2O$, AR, $CO_2$, $H_2$, plastics components and fragments such as alkanes, olefins, polyols, terephthalic acid, hydroxtoluenes, dithio salts, and dirt such as triglycerides, etc. For gettering, these components can be classified into three categories: 1. Reactive gases,; 2. Non-reactive gases; and 3. Liquids or solids with significant vapor pressures.

Getters that are proposed can bind with the gases or vapors by either surface adsorption or by chemical reaction. The metallic getters such as barium are reactive with many of the gases to form oxides, hydroxides, nitrides, etc., which all have extremely low equilibrium gas pressures. For the most part, reactive metals are inactive with organics. Zeolites can getter many gaseous materials but are not efficient unless the operational temperature is near or under the boiling point of the liquid. Even water vapor proposes a problem for most surface adsorptive getters. Molecular sieves and silica and alumina gel types of desiccants are a bit more successful than carbon in holding water, but even these have an equilibrium vapor pressure which might not allow a permanent gettering action.

A combination of two types of getters, such as barium and a molecular sieve, may be useful if they exclusively remove different components from the atmosphere. If, however, such as in the case of $H_2O$, the two getters both remove the same component, the one with the lowest equilibrium vapor pressure curve will be the one that will end up with a majority of the $H_2O$. Due to kinetic effects, water will initially be removed by both, but the water will be gradually desorbed from the molecular sieve to be taken up by the barium and the expensive barium might be consumed completely by water vapor rather than being available to remove gases such as $N_2$ and $O_2$. Preferably water vapor should be removed by low cost getters such as anhydrous calcium sulfate ($CaSO_4$), molecular sieves, or silica. Similarly, the activated charcoal (carbon) is best suited to remove organic gases.

Manufacturing considerations often dictate the getter system. Since all of the getter systems are very active systems towards the atmosphere, special handling considerations must be observed.

A getter material such as barium, although very difficult to handle and very expensive, takes care of purging many gases and acts as a chemical pump to draw $O_2$, $N_2$, etc. out of the vacuum space and to convert the gases to barium oxide, barium nitride, etc. The present invention provides a handleable getter structure which permits getter materials, such as barium, to be used in a manufacturing environment without consuming a significant amount of the getter material.

To provide a handleable getter structure, a getter material is applied to a substrate layer and is covered with a barrier layer. At least one of the substrate and barrier layers is a semi-permeable material, for example a polymer, which, if it is the barrier layer, may either be applied over the layer of the getter material or, the getter material can be incorporated within the semipermeable material. The permeability of the semipermeable layer can be adjusted to prevent rapid diffusion of gases to the getter material so that the getter structure can be handled for relatively short periods of time, generally measured in minutes or hours, during construction of the enclosure. However, over the relatively long duration of the life of the enclosure, generally measured in months or years, gases can be readily absorbed by the getter material. Such a getter structure can be in the form of a sheet which is used as an insert within the sealed enclosure.

The present invention also provides a particular use of the getter materials in a cost advantageous and effective manner. The gettering materials can be arranged to provide isolation of two competing gettering materials. For example, by using a low cost water vapor getter material such as anhydrous calcium sulfate in a small or outer compartment of a vacuum insulation panel and using a more expensive handleable getter material for oxygen, nitrogen and water vapor in the larger or inner compartment of the vacuum insulation panel, less of the expensive getter material will be required to maintain a desired pressure level within the enclosure over the life of the enclosure.

The present invention employs a getter system for use in a multi-compartment vacuum panel. In such a multi-compartment panel, as described in the co-pending patent application Ser. No. 451,330, now U.S. Pat. No. 5,018,328, entitled "MULTI-COMPARTMENT VACUUM INSULATION PANELS", a main vacuum compartment will contain a large volume of filler insulation material and act as the primary insulating compartment. One or more secondary compartments containing a lesser volume of the same or another filler material are provided adjacent to the main compartment as indicated above.

It is advantageous to provide a relatively inexpensive water vapor getter, such as anhydrous calcium sulfate, in the secondary compartments, and an optional more expensive reactive metal gas getter in the main compartment. The water vapor getter in the secondary compartment prevents water vapor from consuming the reactive metal gas getter in the main compartment, thus increasing the useful life of the gas getter and the life of the vacuum panel.

BRIEF DESCRIPTION OF THE DRAWINGS

FIG. 1 is a perspective view of a refrigeration appliance illustrating the use of a vacuum thermal insulation panels.

FIG. 2 is a perspective view of a vacuum insulation panel utilizing a getter structure embodying the principles of the present invention.

FIG. 3 is a side sectional view of a two-compartment vacuum insulation panel illustrating a use of the getter structure embodying the principles of the present invention.

FIG. 4 is a sectional view of a getter structure embodying the principles of the present invention.

FIG. 5 is a sectional view of an alternative embodiment of a getter structure.

FIG. 6 is a sectional view of an alternative embodiment of a getter structure.

FIG. 7 is a sectional view of an alternative embodiment of a getter structure.

FIG. 8 is a schematic illustration of a method of manufacturing the getter structure illustrated in FIG. 7.

DESCRIPTION OF THE PREFERRED EMBODIMENTS

Figure 9:
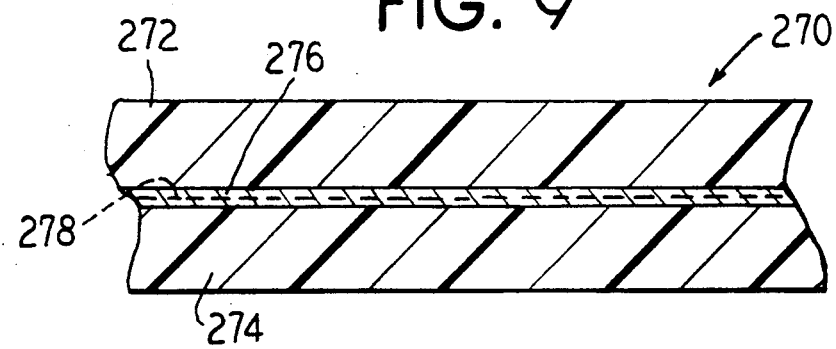
FIG. 9 is a sectional view of an alternative embodiment of a getter structure.

The present invention provides an improved getter structure which can be handled in open atmosphere for a limited time during a manufacturing operation while the getter structure is placed into a sealed compartment or enclosure. An example of such a compartment in which the disclosed getter structure finds particular utility is a vacuum insulation panel as disclosed in co-pending U.S. patent application Ser. No. 451,830, entitled "MULTI-COMPARTMENT VACUUM INSULATION PANELS", filed simultaneously herewith and assigned to the same assignee as the present application. Such a use is an example only and the present invention is not limited to such use. However, to the extent an environment for the use of the getter structure is helpful to a discussion of the present invention, such a use will be utilized in order to present a clear detailed description of the present invention.

In FIG. 1 there is illustrated, by way of example, a refrigeration appliance generally at 10 which comprises a refrigerator compartment 12 and a freezer compartment 14 located above the refrigerator compartment 12. The particular refrigeration appliance illustrated is only a single example of a type of refrigeration appliance that could utilize the present invention. Other environments having a hot side and a cold side could also benefit from the use of the present invention. Also other types of evacuated compartments, than a vacuum insulation panel, could make use of the present invention.

Each of the refrigerator compartments 12, 14 is accessed by means of a separate door 16, 18. The compartments are defined by an interior liner wall 20 which is spaced within an exterior outer shell 22, comprising the refrigeration appliance cabinet. A space 24 between the liner and the shell is normally filled with an insulation material such as polyurethane foam which is injected into the space 24 in a liquid state where it expands and hardens into a porous solid state to form a structural part of the cabinet as well as providing a thermal barrier necessary to prevent rapid warming of the interior compartments. The present invention is utilized within a vacuum insulation panel 28 (FIG. 2) which is to be inserted in the space 24 between the liner 20 and the shell 22 to enhance the insulation property of the insulation systems. Polyurethane foam is also used in the system to provide additional insulation, the structural support it normally provides and to assist in holding the panels 28 in place between the walls 20, 22.

The particular placing and usage of such vacuum panels is disclosed in a co-pending patent application Ser. No. 451,830 entitled "VACUUM INSULATION PANEL SYSTEM FOR INSULATING REFRIGERATION CABINETS", filed simultaneously herewith and assigned to the same assignee as the present invention, and further discussion of the use of such panels will not be contained herein.

Each of the vacuum insulation panels 28 is constructed with a pair of gas impermeable outer film walls 30, 32 (FIG. 3) and at least one gas impermeable inner wall 31 to form at least two adjacent compartments 35, 39 (FIG. 3) enclosing one or more microporous filler insulation materials 34 that support the film walls 30, 31, 32 of the panel when atmospheric gases are evacuated from the interior compartments 35, 39 of the panel. The pressure differential across film wall 31 is very small, while the pressure differential across either of the outer walls 30 and 32 will be approximately equal to atmospheric pressure. The microporous filler material(s) 34 may be in a form of individual sheets of fibrous material such as glass fiber insulation as illustrated in FIG. 3 or, may be in the form of microporous powder material, or mixture of various insulation materials, as described in greater detail in copending application Ser. No. 451,830, entitled "MULTI-COMPARTMENT VACUUM INSULATION PANELS". Of course, any other form and combination of microporous or other porous filler insulation materials may be employed in the various compartments of the vacuum insulation panel. The two outer walls 30, 32 and one inner wall 31 (FIG. 3) or more, are hermetically sealed to each other about their outer edges or periphery 34 to define at least two vacuum seal compartments 35, 39 (FIG. 3) or more. The primary function of the compartment walls 30, 31, 32 made of flexible barrier films is to prevent gas and water vapor permeation into the vacuum panel 28, thereby maintaining the proper vacuum level achieved during its manufacture through evacuation prior to the sealing of the peripheral edges of the panel to form the vacuum insulation compartments. The barrier film comprising an outer layer of metallized or non-metallized plastic laminates and a layer of metal foil 36 laminated to the inner surface 37 of the metallized or non-metallized plastic laminate barrier film has the best permeability characteristics, that is, will maintain the vacuum conditions within the panel for the longest period of time. However, such metal foil laminated barrier films transmit heat along their length and thus it becomes necessary to provide a thermal break in the form of a spacing or gap 38 in the metal film 36, preferably on the order of one quarter inch or larger to prevent the conduction of heat around the exterior of the panel 28 from the hot to the cold side of the panel.

In order to prevent transmission of heat by radiation, in the present invention it has been determined that it is useful to provide layers of highly reflective material such as metallized plastic film or metallic foil 40 within the multilayered fiber paper material 34 so that infrared radiation is reflected rather than transmitted through the panel 28. These radiation shields do not deliver or remove any heat from the overall vacuum panel system; rather they place additional resistance in the heat-flow path so that the overall vacuum panel heat transfer is further retarded.

Figure 11:
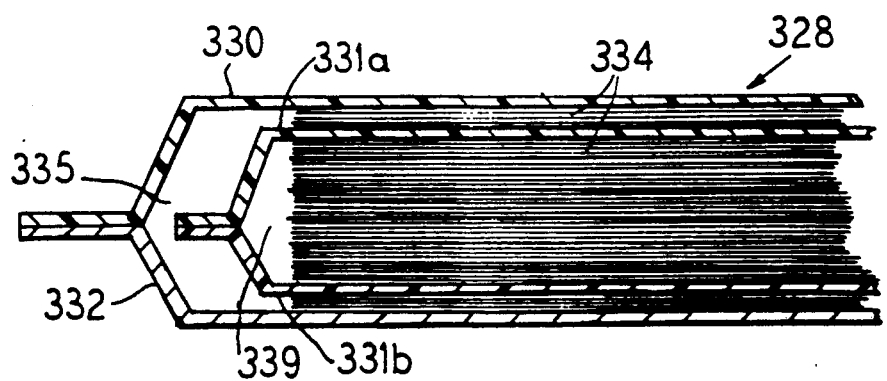
FIG. 11 is a side sectional view of a two compartment vacuum insulation panel, having an inner bag and outer bag forming compartments as a variation of those shown in FIG. 3, and illustrating a use of the getter structure embodying the principles of the present invention.

An alternative construction for the vacuum insulation panel is shown at 328 in FIG. 11 wherein four separate layers 330, 332, 331a and 331b are formed and comprise two completely independent sealed bags. An outer bag defining an outer compartment 335 is formed by layers 330 and 332 which completely encapsulates and surrounds an internal bag defining an inner or main compartment 339 formed by layers 331a and 331b. Within each bag there is provided a microporous filler material 334 as described above.

Referring still to FIGS. 3 and 11, it is necessary to provide within the sealed panels 28, 328 materials to absorb or otherwise interact with gases and vapors that are able to slowly permeate the film walls 30, 32, 330, 332 of the panel. Such materials are known as getters and may include, for example, a granular form of calcium sulfate ($CaSO_4$) which is excellent in removing water vapor, as well as other getter materials such as "ST707" manufactured by SAES Getters (a zirconium-vanadium-iron alloy) or barium which facilitates in removal of gases such as nitrogen and oxygen. Activated charcoal shown in layer form 50 in FIG. 3 is also useful in removing organic vapors.

Another advantage to using multiple compartment panels is that, if desired, the getter materials can be arranged to provide isolation of two competing getter materials. For example, iron may be used as a getter material for oxygen and calcium sulfate may be used as a getter material for absorbing water vapor. Since iron requires water for its reaction, it would be desireable to place the iron getter material in the outer compartment and the calcium sulfate getter material in the main compartment so that the iron would remain in a moist environment for maximum effectiveness and any water vapor which permeated the wall(s) 31, 331a, 331b between the two compartments would then be absorbed by the calcium sulfate getter material in the main compartment 39, 339.

However, for example, if barium or ST-707 is being used as an oxygen and nitrogen absorber, since either reacts quickly to water vapor and does not need water vapor to function to absorb oxygen and nitrogen, it would be advantageous to use the calcium sulfate getter material in the outer compartment(s) 35, 335 and a barium or ST-707 getter material as well as calcium sulfate and activated charcoal in the main compartment 39, 339. Since barium is much more expensive than calcium sulfate, it is much more desirable to use the calcium sulfate to react with the water vapor in the outer compartment 35, 335 rather than the barium.

A preferred embodiment of the present invention is illustrated in FIG. 4 which shows a getter structure 100 made from a thin flexible film substrate 200 of inexpensive material such as PET (poly-ethylene terephthalate) film. Other inexpensive materials such as aluminum foil may be utilized. This substrate 200 then has a getter material layer 202, such as barium or titanium, vapor deposited on one or both faces. It is most efficient for such getter materials to be dispersed finely or in very thin coatings such that the contaminates can be easily contacted. For protection, since such getter materials cannot normally be handled in air, a barrier layer 204 can then be vapor deposited or plasma polymerized onto the getter material layer 202. This barrier layer 204 may either be impermeable, if the substrate 200 is permeable, or may have its permeability adjusted to a level that prevents rapid diffusion of gases to the getter material 202 so that the getter structure can be handled for short periods of time during construction. If the substrate 200 is a semipermeable material, such as PET film, the barrier layer 204 may be an impermeable layer, such as aluminum which may be vapor deposited over the getter material 202. Over the long duration of the life of the insulation, gases can be readily absorbed through the permeable layer of the getter structure.

This getter sheet 100 is simply used as an insert in the airtight insulation enclosure.

FIGS. 5 and 6 illustrate further embodiments of the present invention. Again a thin flexible film of plastic 220 (FIG. 6), such as PET, or a thin metal foil 222 (FIG. 5) can be used as a structural substrate. On one or both sides of this substrate, a layer of finely divided getter material 224, such as barium, should be co-deposited with a material 226 which is semipermeable to the contaminants to be removed. This deposition of finely divided materials can be made advantageously in a vacuum chamber by evaporation, sputtering, etc. The semipermeable portion of the coating could be a material such as PTFE (polytetrafluoroethylene) which can be tailored to allow a slow diffusion of reactive gases to the active getter. This allows time for assembly of an insulative structure in ambient pressure air which is measured in minutes or hours. After the insulation assembly has been evacuated, the semipermeable material is designed so that the contaminants can be absorbed by the getter over a period of the life of the insulation which is measured in months or years.

FIG. 7 shows an alternative embodiment of a getter structure 250 which can be manufactured according to a method illustrated in FIG. 8. Such a structure employs a structural substrate 252 in the form of a thin flexible film of plastic, such as PET, or a thin metal foil. On one side of this structural substrate 252, a layer of finely divided getter material 254, such as barium, should be evaporated to provide the gettering action. A final, double layer comprising a secondary film 256 which may be PET material and including a heat sealing adhesive face 258 is to be applied to the getter material layer 254. The heat sealing adhesive face 258 can be activated between hot rollers 260 within a vacuum chamber 262 where the film is being constructed. The permeabilities of the substrate 252 and covering sheet 256 must be designed to a balance to allow a relatively short period of handling time in a normal atmosphere, but also allow a fast enough diffusion rate to react with atmospheric gases at a low pressure over the relatively long period of months or years that the getter structure is to be utilized.

Figure 10:
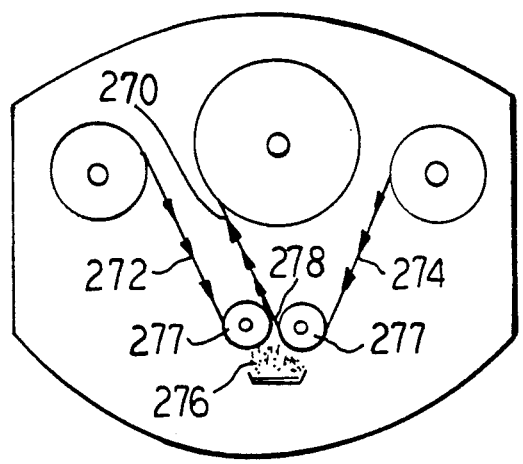
FIG. 10 is a schematic illustration of a method of manufacturing the getter structure illustrated in FIG. 9.

FIG. 9 shows an alternative embodiment of a getter structure 270 which can be manufactured according to a method illustrated in FIG. 10. Such a structure employs two similar structural substrates 272,274 in the form of a thin flexible film of plastic, such as PET. On one side of each of these substrates, a layer of finely divided getter material 276, such as barium, should be deposited by vapor deposition in a vacuum and finally still in vacuum, the two coated substrates are pressed together, getter face to getter face, between a pair of rollers 277 to generate a weld 278 at the junction of the two coatings of the substrates. The permeabilities of the two similar substrates 272,274 must be designed to a balance to allow a relatively short period of handling time in a normal atmosphere, but also allow a fast enough diffusion rate to react with atmospheric gases at a low pressure over the relatively long period of months or years that the getter structure is to be utilized.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The embodiments of the invention in which an exclusive property or privilege is claimed are defined as follows:

1. A vacuum thermal insulation panel comprising:
   a first outer wall having low permeation with respect to atmospheric gasses and vapors;
   a second outer wall having low permeation as to atmospheric gasses and vapors coextensive and parallel with said first outer wall and hermetically sealed together with said first outer wall about their perimeters;
   at least one internal wall having low permeation with respect to atmospheric gasses and vapors parallel with said outer walls, interposed between said first outer wall and said second outer wall;
   a first compartment being defined by said at least one internal wall and one other of said walls, said compartment being evacuated and filled with a porous insulating material, with a pressure differential across said at least one internal wall being small in comparison to atmospheric pressure;
   a second compartment being defined by a second of said outer walls and one other of said walls, said second compartment being evacuated and filled with a porous insulating material, with a pressure differential across said outer wall being approximately equal to atmospheric pressure; and
   a first gas or vapor absorbing material disposed in said first compartment and a second gas or vapor absorbing material having different absorbing characteristics disposed in said second compartment.

2. A vacuum thermal insulation panel according to claim 1, wherein said first compartment is defined by said internal wall and one outer wall and said second compartment is defined by said internal wall and said second outer wall, whereby said first compartment and second compartment share a common wall.

3. A vacuum thermal insulation panel according to claim 1, wherein at least two internal walls are provided and said first compartment is defined by said two internal walls and said second compartment is defined by said two outer walls such that said first compartment is contained wholly within said second compartment.

4. A vacuum thermal insulation panel according to claim 1, further comprising moisture absorbing material disposed in said second compartment and gas absorbing material disposed in said first compartment.

5. A vacuum insulation panel according to claim 4, wherein said moisture absorbing material comprises calcium sulfate.

6. A vacuum insulation panel according to claim 4, wherein said gas absorbing material comprises barium.

7. A vacuum insulation panel according to claim 4, wherein said gas absorbing material is in the form of a handleable getter structure comprising:
   a substrate layer;
   at least one layer of getter material applied to said substrate layer; and
   a barrier layer applied to said getter material;
   at least one of said substrate layer and barrier layer being semi-permeable, with the permeability of said at least one substrate and barrier layer being selected so as to permit the handling of said getter structure in open atmosphere for relatively short periods of time, yet permitting permeation of gases at a sufficient rate so as to provide gettering action by said getter material over relatively long periods of time.

8. A multi-compartment vacuum thermal insulation panel comprising:
- a first outer layer of flexible gas-impermeable film;
- a second outer layer of flexible gas-impermeable film coextensive and parallel with said first outer layer and hermetically sealed together with said first outer layer about their perimeters;
- at least one internal layer of gas-impermeable film parallel with said outer layers interposed between said first outer layer and said second outer layer;
- a first compartment being evacuated and filled with a porous insulating material, said compartment being defined by said at least one internal layer and one other of said layers; and
- at least one secondary compartment being evacuated and filled with a porous insulating material, said second compartment being defined by one of said outer layers and one other of said layers, with a pressure differential across each of said outer layers being approximately equal to atmospheric pressure, and a pressure differential across said at least one internal layer being relatively small;
- a moisture getter material disposed in each of said secondary compartments for absorbing any moisture which permeates through said outer layers; and
- a handleable getter structure disposed in said first compartment for absorbing any gasses which permeate through said internal and outer layers; said handleable getter structure comprising:
  - a substrate layer;
  - at least one layer of getter material applied to said substrate layer; and
  - a barrier layer applied to said getter material;
    - at least one of said substrate layer and barrier layer being semipermeable, with the permeability of said at least one substrate and barrier layer being selected so as to permit the handling of said getter structure in open atmosphere for relatively short periods of time, yet permitting permeation of gases at a sufficient rate so as to provide gettering action by said getter material over relatively long periods of time.

9. A vacuum thermal insulation panel according to claim 8, wherein said first compartment is defined by one internal layer of film and one outer layer of film and said second compartment is defined by said internal layer of film and said second outer layer of film, whereby said first compartment and second compartment share a common film layer.

10. A vacuum thermal insulation panel according to claim 8, wherein at least two internal layers of film are provided and said first compartment is defined by said two film layers and said second compartment is defined by said two outer film layers such that said first compartment is contained wholly within said second compartment.

* * * * *